United States Patent
Nusier et al.

(10) Patent No.: US 9,931,961 B2
(45) Date of Patent: Apr. 3, 2018

(54) BATTERY ENCLOSURE SURROUNDED BY INTERNALLY REINFORCED CYLINDRICAL IMPACT ABSORBING ELEMENTS

(71) Applicant: Ford Global Technologies, LLC, Dearborn, MI (US)

(72) Inventors: Saied Nusier, Canton, MI (US); William L. Stanko, Canton, MI (US); Saeed David Barbat, Novi, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 351 days.

(21) Appl. No.: 14/619,441

(22) Filed: Feb. 11, 2015

(65) Prior Publication Data
US 2016/0233468 A1 Aug. 11, 2016

(51) Int. Cl.
*H01M 2/10* (2006.01)
*H01M 10/0525* (2010.01)
*B60L 11/18* (2006.01)

(52) U.S. Cl.
CPC ....... *B60L 11/1879* (2013.01); *H01M 2/1077* (2013.01); *H01M 2220/20* (2013.01)

(58) Field of Classification Search
CPC .. H01M 2/10; H01M 2/1083; H01M 10/0525; H01M 2/1077; H01M 2/1094; B60L 11/18; B60L 11/1879
See application file for complete search history.

(56) References Cited

U.S. PATENT DOCUMENTS

| | | | |
|---|---|---|---|
| 2,671,599 | A | 3/1954 | Price |
| 5,156,225 | A | 10/1992 | Murrin |
| 6,279,300 | B1 | 8/2001 | Simhaee |
| 6,300,005 | B1 | 10/2001 | Kump |
| 7,572,550 | B2 | 8/2009 | Saito et al. |
| 8,573,647 | B2 | 11/2013 | Enning |
| 8,632,902 | B2 | 1/2014 | Wendorf et al. |
| 8,702,161 | B2 | 4/2014 | Charbonneau et al. |
| 2003/0124315 | A1 | 7/2003 | Grochoski |
| 2008/0124625 | A1 | 5/2008 | Hock et al. |

(Continued)

FOREIGN PATENT DOCUMENTS

| | | |
|---|---|---|
| CN | 102593399 A | 7/2012 |
| CN | 103000835 | 3/2013 |

(Continued)

OTHER PUBLICATIONS

Dr. Lothar Wech, et al., Crash Safety Aspects of HV Batteries for Vehicles, Paper No. 11-0302 , 2011.

*Primary Examiner* — Karie O'Neill Apicella
(74) *Attorney, Agent, or Firm* — Jason Rogers; Brooks Kushman P.C.

(57) ABSTRACT

A battery enclosure for the battery of an electric vehicle is disclosed that is provided with cylindrical impact absorbing tubular members. The tubular members are arrayed about the battery enclosure between an inner wall and an outer wall in a spaced relationship. The tubular members are spaced from each other and include internal reinforcing walls that stiffen the battery enclosure and absorb impact loads. The reinforcing walls may be in an X-shaped, Y-shaped or parallel and may be oriented to absorb impact loads to a greater or lesser extent.

6 Claims, 5 Drawing Sheets

(56) References Cited

U.S. PATENT DOCUMENTS

| | | |
|---|---|---|
| 2012/0121946 A1 | 5/2012 | Eckstein et al. |
| 2012/0183828 A1 | 7/2012 | van den Akker |
| 2014/0287297 A1 | 9/2014 | Reitzle et al. |

FOREIGN PATENT DOCUMENTS

| | | | | |
|---|---|---|---|---|
| CN | 203434226 U | 2/2014 | | |
| CN | 103730616 A | * 4/2014 | ............. | H01M 2/10 |
| DE | 102008059941 A1 | 6/2010 | | |
| DE | 102009053138 A1 | 5/2011 | | |
| DE | 102010024320 A1 | 12/2011 | | |
| DE | 102010043899 A1 | 5/2012 | | |
| DE | 102010050826 A1 | 5/2012 | | |
| DE | 102011120960 A1 | 4/2013 | | |
| DE | 102011118284 A1 | 5/2013 | | |
| DE | 102011120010 A1 | 6/2013 | | |
| DE | 102012012294 A1 | 12/2013 | | |
| DE | 102012015919 A1 | 2/2014 | | |
| ES | 2396407 A2 | 2/2013 | | |
| GB | 2186253 A | 8/1987 | | |
| KR | 100210949 B1 | 7/1999 | | |
| TW | 201421776 | 6/2014 | | |
| WO | 2012025166 | 3/2012 | | |
| WO | 2012073439 A1 | 6/2012 | | |
| WO | 2013079080 A1 | 6/2013 | | |
| WO | 2013156732 | 10/2013 | | |
| WO | 2013180611 A1 | 12/2013 | | |
| WO | 2014034020 | 3/2014 | | |

\* cited by examiner

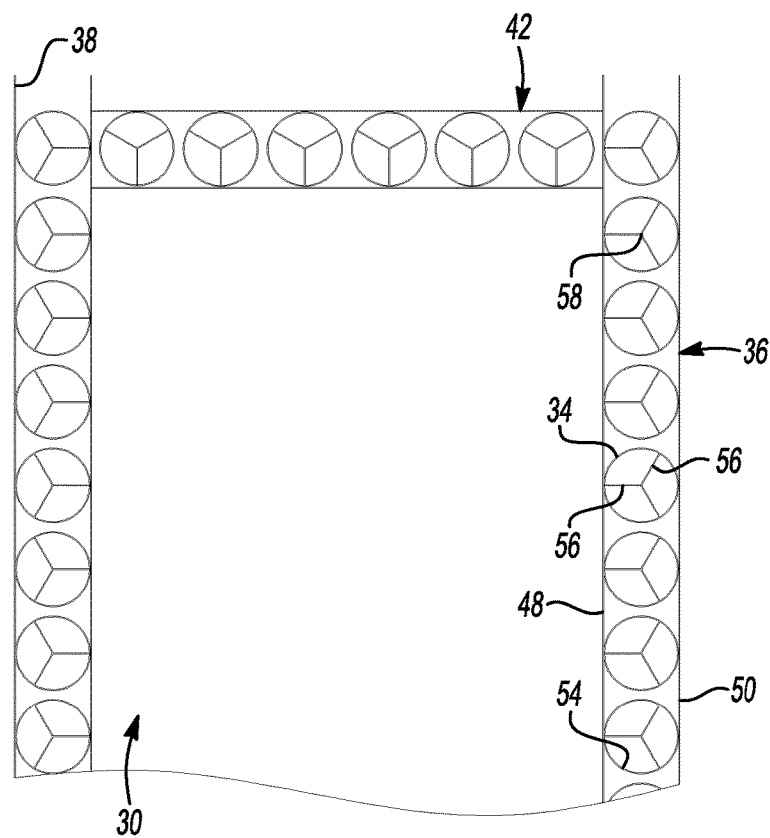
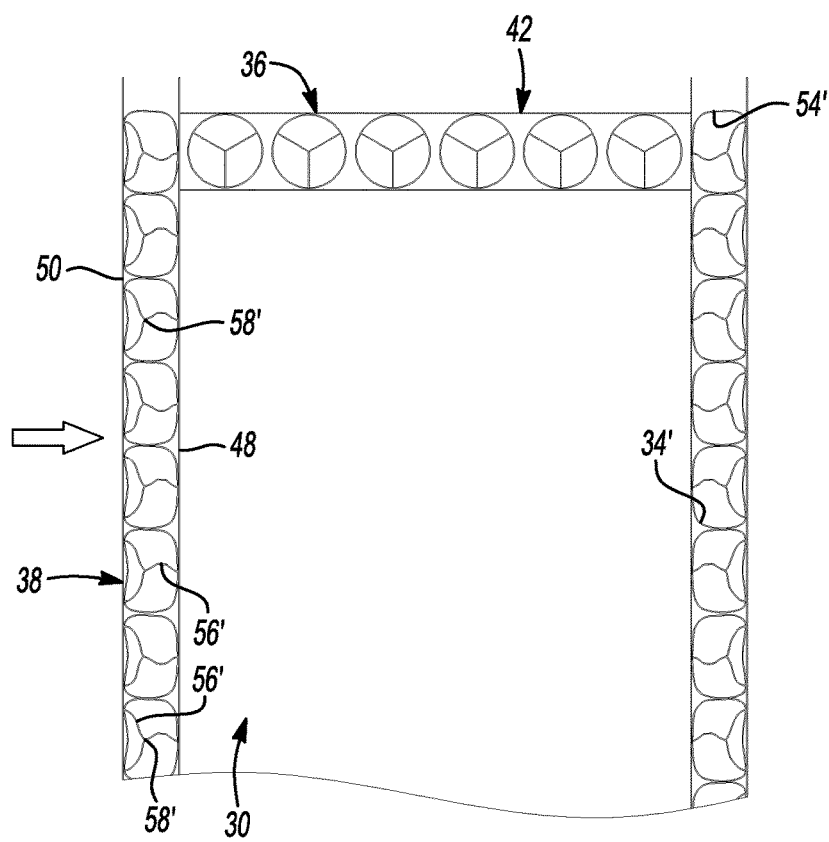

BATTERY ENCLOSURE SURROUNDED BY INTERNALLY REINFORCED CYLINDRICAL IMPACT ABSORBING ELEMENTS

TECHNICAL FIELD

This disclosure relates to protective structures for battery enclosures for electric vehicle batteries.

BACKGROUND

Electric vehicles use batteries that are enclosed in an enclosure or housing that is assembled to the vehicle body. The battery may be assembled to the vehicle body at a location that is spaced from the front, rear and sides of the vehicle. For example, the battery may be assembled below the passenger compartment, in the trunk, in front of the passenger compartment or in a longitudinally extending tunnel.

The battery must be protected from damage in a collision. The battery housing may be tightly packed with lithium ion battery packs or other types of battery cells. Deformation of the battery housing is to be avoided to prevent intrusion of the housing into the area housing the battery cells. Intrusions into the battery housing may rupture of battery cells and spill the contents of the battery cells.

When the battery housing is assembled in a central location in the vehicle, e.g. beneath the passenger compartment, limited crush space is available between the side of the vehicle body and the battery enclosure. More crush space is available between the battery enclosure and the front or rear ends of the vehicle. In either situation, there is a long felt and unfulfilled need for an efficient and effective lightweight structure for absorbing energy from a collision that minimizes battery enclosure deformation. The structure must have limited package space requirements while providing added stiffness to the battery enclosure assembly including the impact absorbing structure.

Some approaches to protecting the battery enclosure have proposed adding beams and cross members on the battery enclosure or extending outboard of the battery enclosure. These approaches add weight to the vehicle and require additional space to package the beams and cross members. Added weight is to be avoided because added weight adversely affects fuel economy. Increasing packaging space requirements adversely affects vehicle design freedom.

The above problems and other problems are addressed by this disclosure as summarized below.

SUMMARY

According to one aspect of this disclosure, an enclosure for a traction motor battery for an electric vehicle is disclosed that includes a plurality of inner walls, a plurality of outer walls, and a plurality of cylindrical tubular impact absorbing members attached to each other about the sides of the battery. The cylindrical tubular impact absorbing members are reinforced by a plurality of internal walls. The impact absorbing members are attached between one of the inner walls and one of the outer walls.

According to other aspects of this disclosure, the impact absorbing members may be spaced from adjacent impact absorbing members to provide clearance for the impact absorbing members to collapse toward the inner wall and the adjacent impact absorbing members in an impact. The reinforcing walls of the impact absorbing members may contact an inner tubular wall of the impact absorbing members at three spaced locations and intersect at a central location within the impact absorbing members. The reinforcing walls of the impact absorbing members may be disposed in a parallel orientation and may contact the inner tubular wall of the impact absorbing members at spaced locations. Alternatively, the reinforcing walls of the impact absorbing members may contact an inner tubular wall of the impact absorbing members at four spaced locations and intersect at a central location.

The reinforcing walls of the impact absorbing members may be assembled or formed between the inner wall and the outer wall to adjust a stiffness of the enclosure by arranging the impact absorbing members to orient the reinforcing walls.

According to further aspects of this disclosure, the inner wall, the impact absorbing members, and the outer wall may be formed in a single extrusion. Alternatively, the impact absorbing members may be welded to the inner wall and to the outer wall.

The impact absorbing members on vertical sides of the enclosure may have a cylindrical axis that is vertically oriented and the impact absorbing members on horizontal sides of the enclosure may have a cylindrical axis that is horizontally oriented. The impact absorbing member is attached to the inner wall and the outer wall with the cylindrical axes extending in a direction that is parallel to the respective walls.

According to another aspect of this disclosure, a method is disclosed for providing an impact absorbing battery enclosure for a battery of a vehicle having a traction motor. One method includes extruding an inner wall, an outer wall and a plurality of spaced cylindrical impact absorbing tubular members to form an enclosure side. A plurality of enclosure sides are assembled to form an enclosure and the plurality of enclosure sides are assembled together to form the battery enclosure.

According to another method of providing an impact absorbing battery enclosure, a plurality of spaced cylindrical impact absorbing tubular members may be separately extruded. An inner planar wall and an outer planar wall are provided and the cylindrical impact absorbing tubular member may be assembled between the inner planar wall and an outer planar wall to form an enclosure side. The enclosures sides are then secured to form the battery enclosure.

According to other aspects of either of the above methods, a plurality of internal reinforcing walls may be extruded inside the cylindrical impact absorbing tubular members. The internal reinforcing walls of the impact absorbing members may contact an inner tubular wall of the impact absorbing tubular members at three spaced locations and intersect at a central location within the impact absorbing members. In another example, the reinforcing walls of the impact absorbing members may contact an inner tubular wall of the impact absorbing tubular members at spaced locations, wherein the reinforcing walls are disposed in a parallel orientation. Alternatively, the reinforcing walls of the impact absorbing members may contact an inner tubular wall of the impact absorbing tubular members at four spaced locations and intersect at a central location within the impact absorbing members.

The above aspects of this disclosure and other aspects will be described below with reference to the attached drawings.

BRIEF DESCRIPTION OF THE DRAWINGS

FIG. 4 is a fragmentary top plan view of the battery enclosure shown in FIG. 2.

FIG. 5 is a fragmentary top plan view of the battery enclosure shown in FIG. 2 after absorbing an impact in the fore/aft direction.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
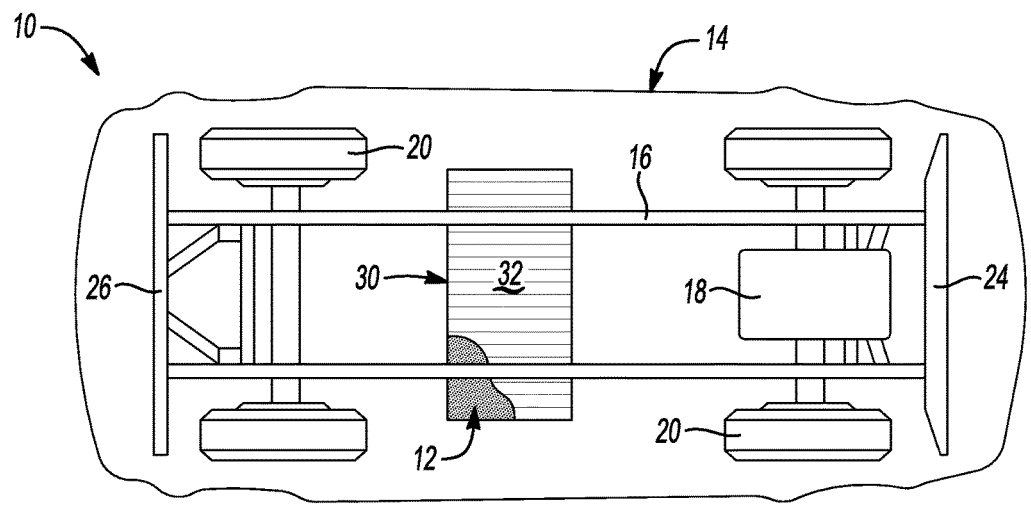
FIG. 1 is a diagrammatic bottom plan view of a vehicle illustrating a battery enclosure disposed on the vehicle frame beneath the passenger compartment.

Referring to FIG. 1, an electric vehicle 10 is diagrammatically illustrated with a battery 12. The vehicle 10 includes a body 14 that is supported on a frame 16. A traction motor 18 is assembled to the frame 16 that is a battery-powered traction motor powered by the battery 12 to drive the wheels 20. The body 14 includes a side body 22, a front bumper 24 and a rear bumper 26. The battery 12 is shown to be centrally located underneath the passenger compartment of the vehicle 10. It should be noted that there is a substantially greater amount of space between the battery and the front and rear bumper 24 and 26 compared to the relatively closer spacing of the side body 22 to the battery 12. Side impact collisions that result in driving the side body 22 toward the battery 12 present a greater challenge when designing impact absorbing elements for the battery 12 due to the reduced amount of crush space available between the side body 22 and the battery 12.

Figure 3:
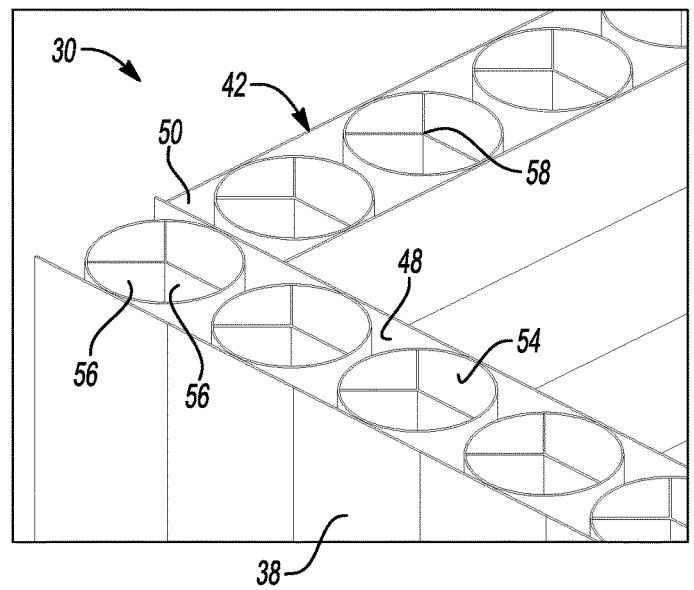
FIG. 3 is a fragmentary enlarged perspective view of a portion of the battery enclosure illustrated in FIG. 2.
Figure 2:
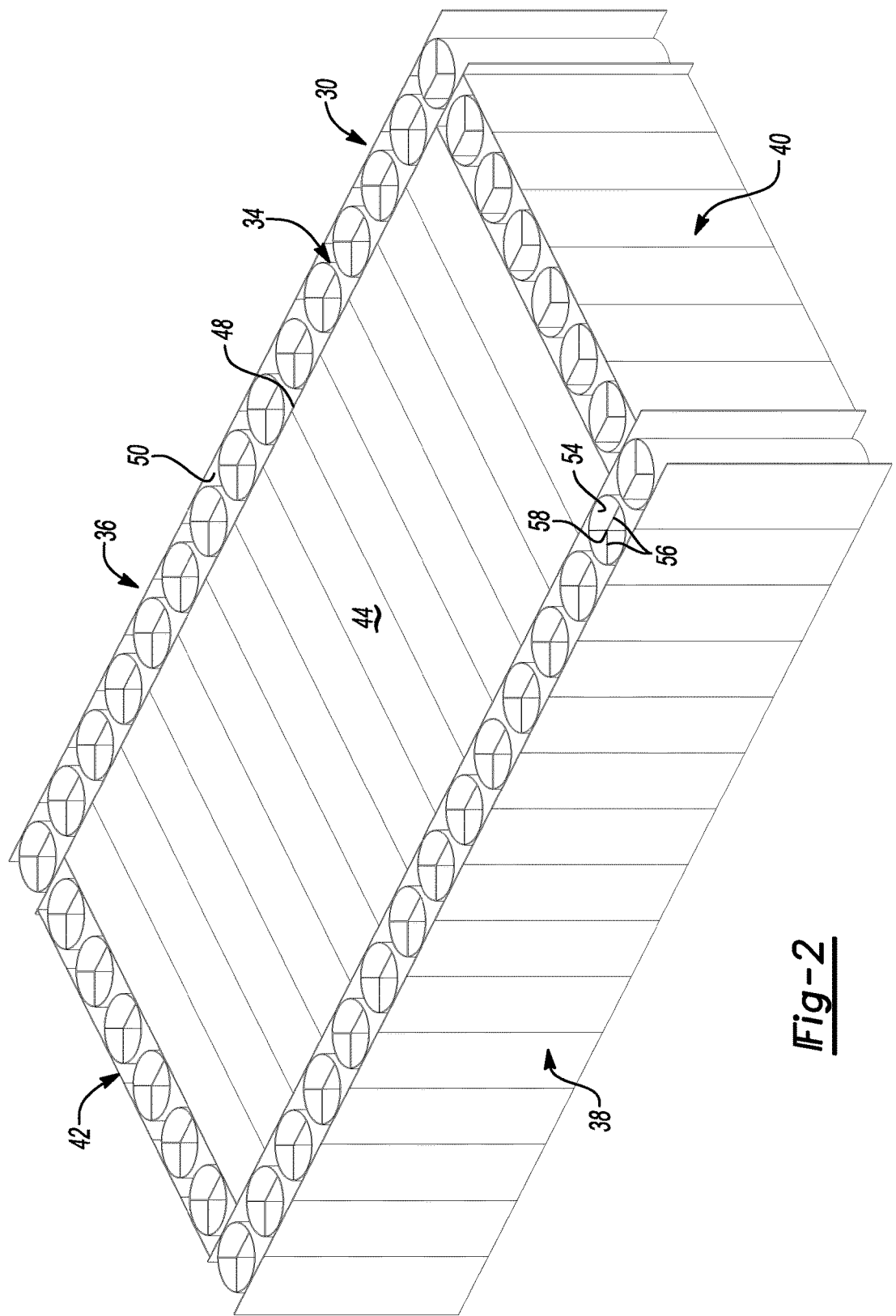
FIG. 2 is a perspective view of a first embodiment of a battery enclosure including a plurality of internally reinforced cylindrical impact absorbing members disposed about the four lateral sides of the enclosure.

Referring to FIGS. 2 and 3, the battery enclosure 30 is illustrated in its entirety in FIG. 2 and is partially illustrated in FIG. 3. The battery enclosure 30 includes a plurality of cylindrical impact absorbing tubular members 34 that are arranged around a front side 36, a rear side 38, a right side 40 and a left side 42. A top side 44 is also covered by the tubular members 34 as well as the bottom side 32 (shown in FIG. 1). The cylindrical impact absorbing tubular members 34 on the top side 44 and bottom side 32 are received inside an inner wall 48 of the side walls 36-42.

In an alternative embodiment, the tubular members 34 on the top side 44 and bottom side 32 may be arranged to be on top of the tubular members 34 on the other sides 36-42. The tubular members 34 on the sides 36-42 have a cylindrical axis that extends in a vertical direction. The tubular members 34 on the top and bottom sides 44 and 32 are shown to extend in a horizontal direction. The tubular members 34 on the right side 40 and left side 42, as illustrated, extend in a vertical direction. Alternatively, they may be arranged to extend in a horizontal direction. The cylindrical impact absorbing members 34 are attached between the inner wall 48 and an outer wall 50. The outer wall 50 forms the outer surface of the battery enclosure 30. The tubular members 34 are spaced from adjacent tubular members 34.

The tubular members 34 include an inner cylindrical wall surface 54. Internal reinforcing walls 56 are formed within the inner cylindrical wall surface 54. The internal reinforcing walls in the embodiment shown in FIG. 2 meet at an intersection 58 that is generally aligned with the cylindrical axis of the tubular members 34. The tubular members 34 are preferably formed in an extrusion process and are integrally formed with the internal reinforcing walls 56 interconnecting the inner cylindrical wall surface 54. The tubular members 34 may be extruded as a tubular extrusion and cut to length. Alternatively, the tubular members 34 may be extruded with the inner wall 48 and outer wall 50. If the tubular members 34, the inner wall 48 and the outer wall 50 are extruded in one extrusion, no subsequent assembly would be required to form each of the sides of the battery enclosure 30. The sides of the battery enclosure are attached to each other with suitable fasteners or adhesives.

Alternatively, the tubular members 34 may be separately extruded and subsequently attached to the inner wall 48 and the outer wall 50 by welding, fasteners, or adhesives that are used to connect the inner wall 48 and outer wall 50 to the tubular members 34.

Referring to FIGS. 4 and 5, part of a battery enclosure 30 is shown in FIG. 4 in its as-manufactured condition with the front side 36 and rear side 38 partially shown and the left side 42 extending between the respective front side 36 and rear side 38. FIG. 5 is a similar view showing the result of an impact applied to the vehicle (shown in FIG. 10). In an impact, the tubular members 34' on the front side 36 and rear side 38 absorb the impact by collapsing toward the inner wall 48. The outer wall 50 is driven by the impact into the cylindrical impact absorbing tubular members 34. The tubular members 34' collapse toward the inner wall 48 and also expand laterally toward adjacent tubular members 34'. The internal reinforcing walls 56' deform with the tubular members 34'. The material, size, thickness and arrangement of the internal reinforcing walls 56 may be changed to increase or decrease the extent to which impacts are absorbed by the battery enclosure 30.

Figure 6:
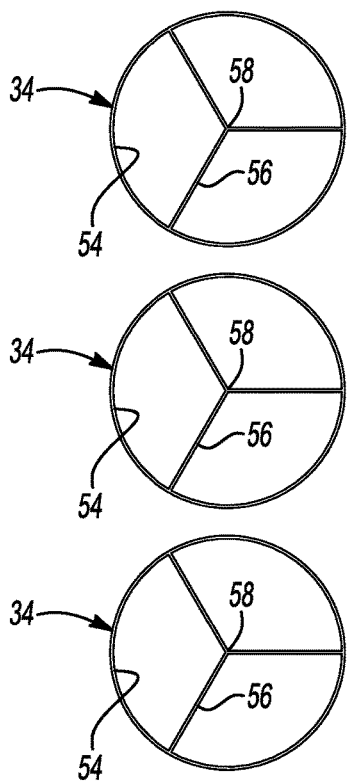
FIG. 6 is a diagrammatic top plan view of three cylindrical impact absorbing members having a Y-shaped internal reinforcement prior to an impact.
Figure 7:
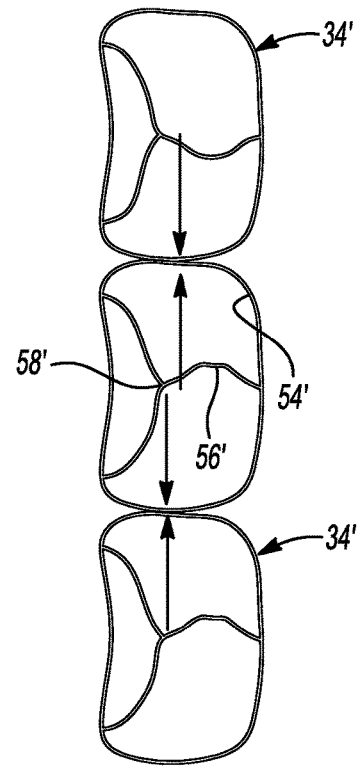
FIG. 7 is a diagrammatic top plan view of three cylindrical impact absorbing members having a Y-shaped internal reinforcement after an impact.

Referring to FIGS. 6 and 7, a set of tubular members 34 are shown in FIG. 6 in their as-designed condition and in FIG. 7 are shown subsequent to or during an impact. The tubular members 34 include internal reinforcing walls 56 inside the inner cylindrical wall surface 54 that divide the internal space into thirds and meet at an intersection 58. After an impact, the internal reinforcing walls 56' are distorted along with the tubular member 34' and the intersection 58' moves with the internal reinforcing walls 56'.

Figure 8:
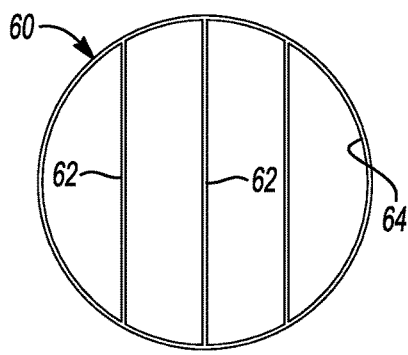
FIG. 8 is a top plan view of cylindrical impact absorbing member having three parallel walls that form an internal reinforcement.

Referring to FIG. 8, an alternative embodiment of a tubular member 60 is shown to include—in this example—three reinforcing walls 62 that extend across the tubular member 60 and are preferably integrally formed with the inner cylindrical wall surface 64 of the tubular member 60. In this embodiment, loads absorbed in the direction that the parallel reinforcing walls extend would be greater than loads absorbed by the tubular member in a direction that is normal to the direction that the parallel reinforcing walls 62 extend. As will be appreciated, the orientation of the tubular member 60 may be changed in angular orientation to an angle between 0° and 90° to absorb greater or lesser loads in an impact depending upon the collision impacts to be absorbed by the battery enclosure 30.

Figure 9:
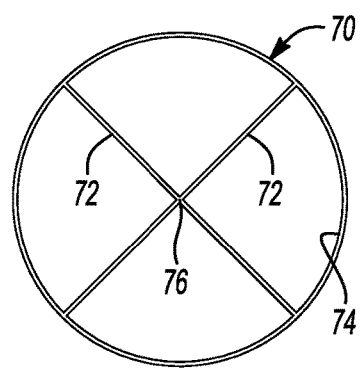
FIG. 9 is a top plan view of cylindrical impact absorbing members having an X-shaped internal reinforcement.

Referring to FIG. 9, another alternative embodiment of a tubular member 70 is shown that includes an X-shaped reinforcing wall. The tubular member 70 includes crossing reinforcing walls 72 that extend between the inner cylindrical wall surface 74 to a central intersection 76. The orientation of the crossing reinforcing walls 72 affects the impact absorbing characteristics of the tubular member 70. Loads applied between the cross reinforcing walls 72 are expended to be less than loads applied to the reinforcing walls 72 if the reinforcing wall 72 is aligned with the impact.

Figure 10:
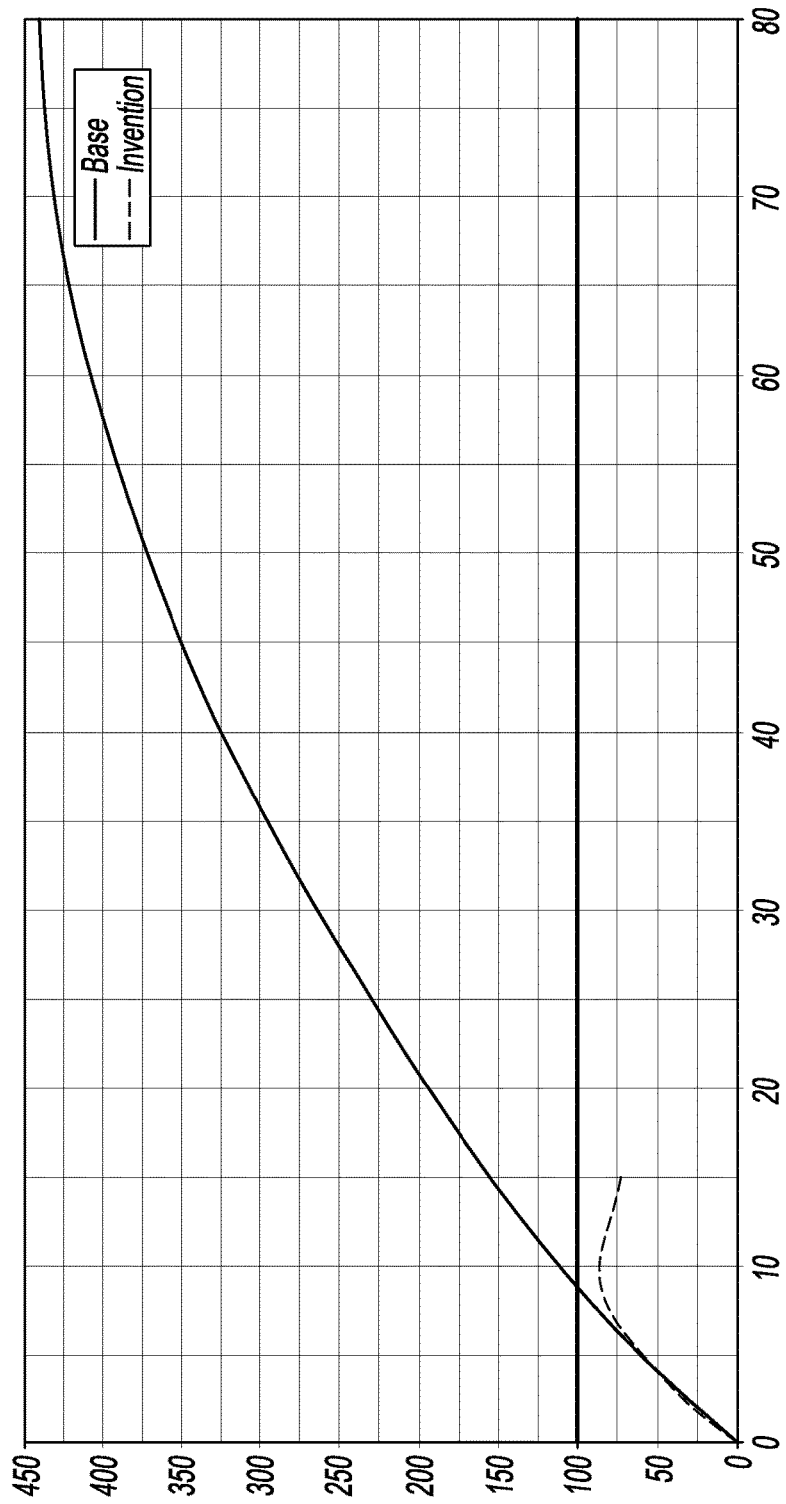
FIG. 10 is a graph of battery case deformation test simulation comparing a base steel battery case without the impact absorbing members to an aluminum battery case made according to the embodiment of FIG. 2 with internally reinforced cylindrical impact absorbing members on all sides.

Referring to FIG. 10, a graph is shown of a test comparing a base high strength, low alloy (HSLA) 450 battery case having a wall thickness of 1.5 mm and a weight of 52 kg. The base steel battery case is compared to an aluminum battery case (as shown in FIG. 2) made of an aluminum alloy AL6061-T6 and having a weight of 55 kg. In this example, the wall thickness of the tubular members 30 is 0.7 mm with the internal reinforcing walls 56 having a thickness of 0.8 mm. The inside wall has a thickness of 0.7 mm and the outer wall 50 has a thickness of 0.5 mm. In an impact, as illustrated in FIG. 10, the base battery case deformed by 440 mm over a period of 80 ms, while the battery case made according to the embodiment of FIG. 2 had a maximum deformation of 80 mm over a period of 10 ms. Note, the deformation of the battery case had approximately 5 mm of spring back from 10 ms to 15 ms in the test. The test was a simulated test based upon computer aided engineering test simulation data.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An enclosure comprising:
   inner and outer walls attached to plural sides of a vehicle battery; and
   plural cylindrical tubular impact absorbers including plural internal reinforcing walls, wherein the impact absorbers are attached to one of the inner walls and one of the outer walls, the reinforcing walls of the impact absorbers contact an inner cylindrical wall surface of the impact absorbers at three spaced locations and intersect at a central location within the impact absorbers.

2. The enclosure of claim 1 wherein the impact absorbers are spaced from an adjacent impact absorbers to provide clearance for the impact absorbers to collapse toward the inner wall and the adjacent impact absorbers in an impact.

3. The enclosure of claim 1 wherein the reinforcing walls of the impact absorbers may be arranged between the inner wall and the outer wall to adjust a stiffness of the enclosure by arranging an orientation of the reinforcing walls of the impact absorbers.

4. The enclosure of claim 1 wherein the inner wall, the impact absorbers, and the outer wall are formed in a single extrusion.

5. The enclosure of claim 1 wherein the impact absorbers are welded to the inner wall and to the outer wall.

6. The enclosure of claim 1 wherein the impact absorbers on vertical sides of the enclosure have a cylindrical axis that is vertically oriented, the impact absorbers on horizontal sides of the enclosure have a cylindrical axis that is horizontally oriented, and wherein the cylindrical axes extend in a direction that is parallel to the inner wall and the outer wall that the impact absorbers is attached.

* * * * *